March 20, 1945.                M. WATTER                    2,372,143
                        AIRFOIL NOSE CONSTRUCTION
                        Filed March 17, 1943          2 Sheets-Sheet 1
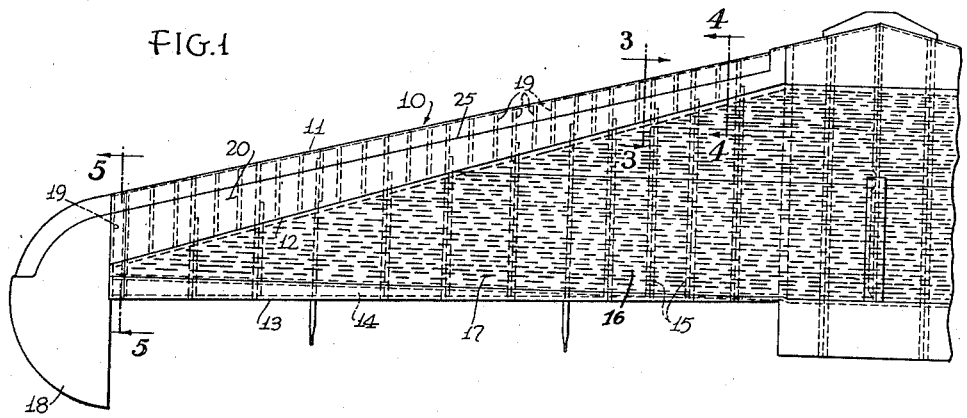
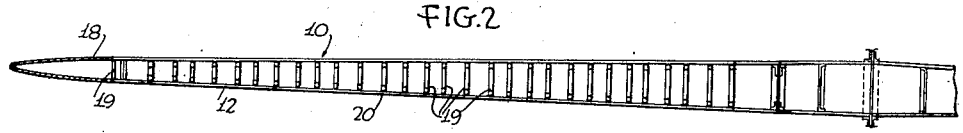
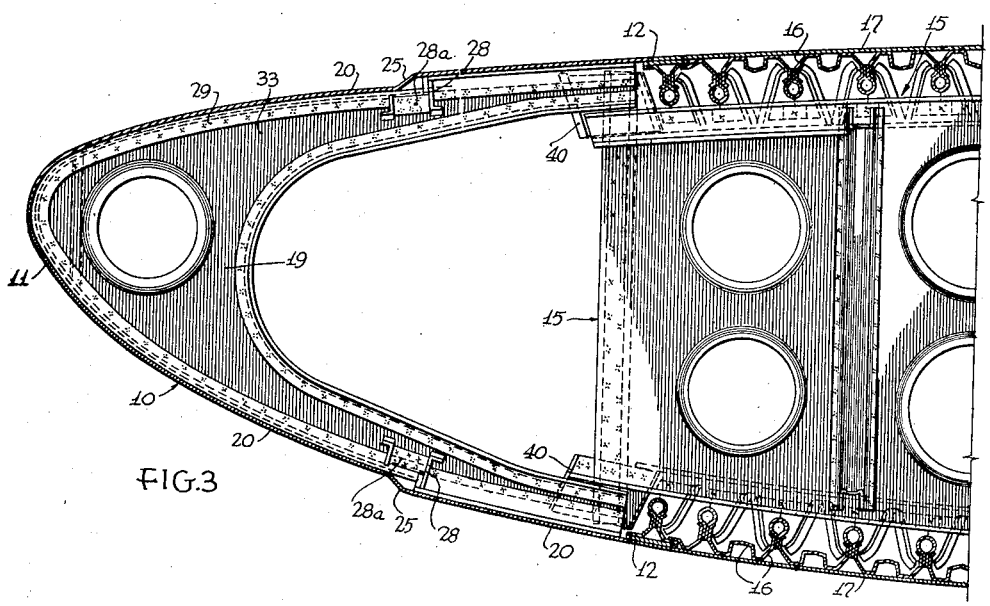
INVENTOR
Michael Watter.
BY John P. Tarbox
                    ATTORNEY March 20, 1945.  M. WATTER  2,372,143
AIRFOIL NOSE CONSTRUCTION
Filed March 17, 1943  2 Sheets-Sheet 2
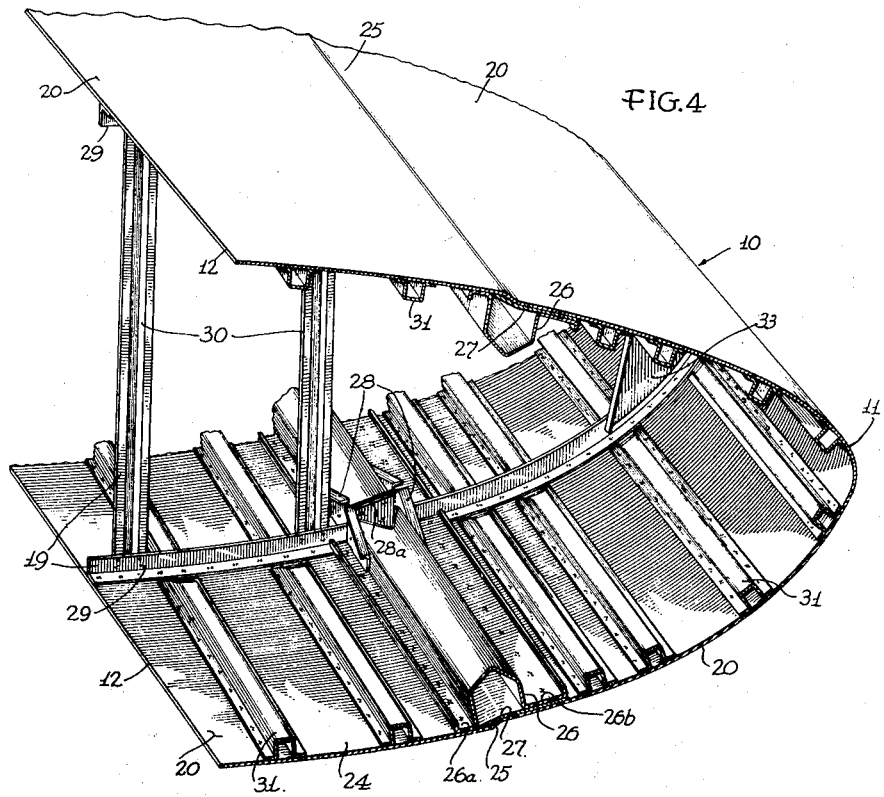
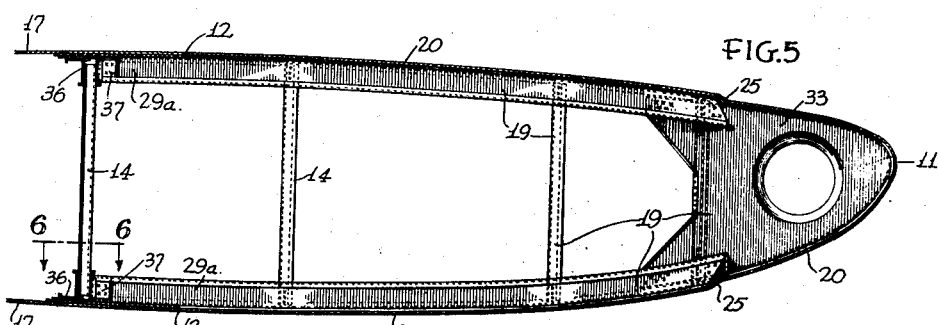
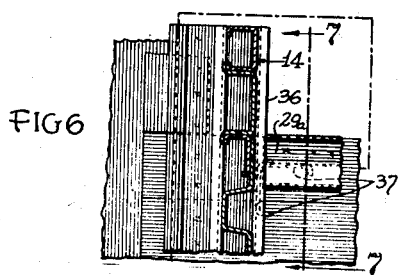
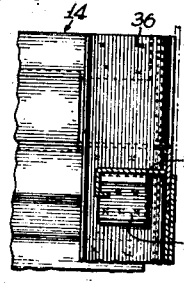
INVENTOR
Michael Watter.
BY John P. Tarbox
ATTORNEY Patented Mar. 20, 1945

2,372,143

UNITED STATES PATENT OFFICE 2,372,143

AIRFOIL NOSE CONSTRUCTION

Michael Watter, Philadelphia, Pa., assignor to Edward G. Budd Manufacturing Company, Philadelphia, Pa., a corporation of Pennsylvania Application March 17, 1943, Serial No. 479,438

7 Claims. (Cl. 244—123)

This invention relates to an airfoil construction, especially adapted for use in connection with stabilizing surfaces but it may well be that there shall arise occasions and conditions in which it may be found of utility in connection with airfoil surfaces for other purposes either for large such surfaces as for example wings of airplanes, or smaller such surfaces as for example control surfaces. The endeavor is to save a maximum of weight in such a construction, save this weight while retaining a highly adequate factor of safety.

In this instance the endeavor has produced results through the fact that the construction of the front spar itself is composed of nose ribs and a covering skin secured thereto in combination with the complementary main body of the airfoil which in part or whole forms the remainder of the airfoil section and embodies a skin supported by laterally extending stringers. Such a front spar is, according to the invention, formed narrow and deep at that portion of the airfoil which is nearest its anchorage or securement to the aircraft body and wide and thin remote therefrom and provided with rearwardly divergent front and rear boundaries. The complemental main body is provided with skin supporting stringers which extend laterally and terminate substantially at the rearward boundary of the spar.

In this manner the sufficiency of strength of the front spar to carry the lesser stresses toward the outboard or tip parts of the airfoil is made use of through a much larger area of the tapered portions of the airfoil than of the usual constructions, there is a greater proportion of these loads taken directly into the front spar, and the hitherto used heavier spars and longer stringers with their increase in weight and complications are avoided.

In the accompanying drawings:

Fig. 1 is a plan view of the central portion and one side of a horizontal stabilizer embodying the invention;

Fig. 2 is a rear view of the front spar of Fig. 1 before it is assembled with the main part of the airfoil the view showing the tip in section;

Fig. 3 is a greatly enlarged vertical section showing the front end of a typical rib in elevation, the view being taken about on the line 3—3 of Fig. 1;

Fig. 4 is a transverse section of the front spar on line 4—4 of Fig. 1;

Fig. 5 is a transverse section of the front spar on line 5—5 of Fig. 1, showing the end rib in elevation;

Fig. 6 is an enlarged horizontal section on line 6—6 of Fig. 5 to show the connection between the end rib and the rear spar; and Fig. 7 is a vertical section and side elevation on the line 7—7 of Fig. 6.

The airfoil shown in Fig. 1 is a horizontal stabilizer having a hollow leading portion or nose spar 10, both the front edge 11 and the rear edge or boundary 12 of which are rearwardly divergent. The trailing edge 13 of the airfoil or stabilizer is also slightly rearwardly divergent but far less so than the front edge 11. This trailing edge 13 is built about a rear spar 14 shown in dotted lines in Fig. 1 as substantially rectilinear in form. Interconnecting the leading edge or nose portion 10 of the airfoil and the rear spar 14, Figs. 1 and 3, are series of typical or principal ribs 15; and supported by them are laterally extended skin blanket stringers 16 which in turn carry the blanket skin 17. As shown in Fig. 1, the stringers 16 terminate approximately at the rear edge of the front spar. Airfoil tips 18 are separately constructed and attached to the lateral extremities of the airfoil.

The front spar 10 of the leading edge of the airfoil, as can clearly be seen in Fig. 4, is comprised of nose or front spar ribs 19 and a skin 20 secured thereto. The rearward edges 12 of the nose blanket skin 20 mark the rearward boundary of the front spar. As is clearly to be seen from the drawings (Figs. 1, 3, 4 and 5), the front spar, so comprised, is relatively narrow and deep at its inner portion, Figs. 1 and 4, which is to be anchored to the aircraft body, and is relatively wide and thin near its outer portion or terminal extremity, Figs. 1 and 5, to which the tip 18 is to be secured.

The skin 20 of this front spar, both top and bottom, is provided with a longitudinally extending inwardly offset portion 25 to provide for the accommodation of de-icing apparatus (not here shown). Longitudinally coextensive with this offset 25 are reinforcing backing stringers 26 of flanged channel cross section secured to the skin by welding the flanges 26a and 26b thereto and with the channel bridging the offset 25. An additional reinforcing strip or plate 27 is interposed in bridging relation to the offset between the stringer and the skin, being through-welded to the skin within the channel and beneath the stringer flanges on one side.

These stringers 26 are longitudinally segmental, the segments being spaced apart at the ribs, as shown in Fig. 4. The stringer segments are bridged across the chords 29 of the ribs 19 by U-shaped clips 28, the sides of the clips being welded to the sides of the stringer segments and the bottoms of the clips being welded together through a filler plate 28a and also to the inner flanges of the chords 29 of the ribs 19. The sides of the U-shaped members 28 are flanged outwardly and tapered to their extremities to afford added strength and rigidity of the connection. The ends of the stringers are V-notched to provide access for welding.

Fig. 4 also shows further details of construction of the front spar 10. For example, the nose ribs 19, in addition to the chords 29, comprise intermediate truss work or webbing, specifically the struts 30. The skin 20 of the front spar also has welded thereto a system of small stiffening stringers 31 of channel form, each stringer terminating at the rib chords 29.

In the nose portion of the spar, Figs. 3, 4 and 5, there are provided nose plates 33 constituting part of the ribs 19, and the plates 33 are welded to the inner flanges of the rib chords 29 where provided. It will be noted from Figs. 3 and 4 that at the inner ends of the front spar where the nose is deep, the rib chords 29 extend completely around the skin-contacting edge of the nose plates, while in Fig. 5 it may be seen that at the outer end of the front spar where it is thin, the nose plate 33 alone forms the front end of the rib.

Some of the ribs 19 of the front spar terminate at the rear edge thereof, as shown in Fig. 4; that is, the ribs 19 are coextensive with the covering skins 20. The chords 29 of these ribs may be formed of angle-sectioned members of relatively light stock. The outermost rib, as shown in Figs. 5, 6 and 7 has heavier chords 29a of Z-shaped stock which extend to the rear spar 14, being secured to the caps 36 of the rear spar by angle plates 37. At other points, as shown in Fig. 3, the ribs 19 of the front spar are connected to the front ends of the ribs 15 of the main portion of the airfoil. The connection includes gusset plates 40.

It is thus seen that the invention provides an improved airfoil of great strength for its weight, and this by a very simple construction in which the nose is formed into a sturdy front spar; also that by making the hollow front spar deep and narrow at the inner end and shallow and wide at the outer end the operating stresses are well distributed.

While one embodiment of the invention has been described for purposes of illustration it is to be understood that the invention may have various embodiments within the limits of the prior art and the scope of the subjoined claims.

What is claimed is:

1. In an airfoil, a front spar comprising the leading edge construction of the airfoil, which spar consists of the frontal hollow portion of metal ribs and a metal skin covering secured thereto, which said spar is relatively narrow and deep at its inner root end and relatively wide and thin at its outer tip end.

2. In an airfoil, a front spar according to claim 1, in which the spar as a structural unit is defined on its rearward side by the termini of its ribs and to the terminal edges of the skin which covers and is secured to those ribs.

3. In an airfoil, a front spar according to claim 1, which spar in its rearward boundary has sweep-back, together with a main body construction complementing said front spar to complete the airfoil section, said main body including skin supporting laterally extending stringers which terminate at their outer ends substantially at the said rearward boundary of the front spar.

4. In an airfoil, a front spar comprising the leading edge of the airfoil, which leading edge is composed of nose ribs and an encompassing skin secured thereto, both of metal, and the skin having an inward offset running longitudinally of the spar to provide for de-icing equipment together with a reinforcing stringer for said offset portion of the skin, which stringer is substantially coextensive with said offset and is secured to the skin with its cross section in bridging relation to said offset.

5. In an airfoil a front spar according to claim 4, in which the said stringer is segmental in its construction, and its segments are bridged integrally across said nose ribs.

6. In an airfoil, a front spar according to claim 4, in which the said stringer is of flanged channel cross section, is longitudinally segmental in form, and has its flanges secured to the skin of the opposite sides of the offset and its longitudinal segments bridged integrally across the nose ribs by U-shaped clips having their sides welded to the sides of the channel and their bottoms welded together in the planes of inturned elements of the ribs.

7. In a structural assembly in combination, a skin sheet having rigidifying frame members extending transversely of each other with aligned rigidifying members running in one direction abutting the sides of a rigidifying member running through in the crossing direction, and U-shaped clips having side flanges welded to the sides of the abutting members and having their bottoms welded together in the plane of the through-running member.

MICHAEL WATTER.